US006439730B1

(12) United States Patent
Foote et al.

(10) Patent No.: US 6,439,730 B1
(45) Date of Patent: Aug. 27, 2002

(54) EXTENDABLE MIRROR WITH IMPROVED DETENT

(75) Inventors: Keith D. Foote, Kentwood; Ian Boddy, Ada; Benjamin D. Newton, Saranac, all of MI (US)

(73) Assignee: Magna Mirror Systems, Inc., Kentwood, MI (US)

( * ) Notice: Subject to any disclaimer, the term of this patent is extended or adjusted under 35 U.S.C. 154(b) by 0 days.

(21) Appl. No.: 09/829,358

(22) Filed: Apr. 9, 2001

Related U.S. Application Data

(63) Continuation-in-part of application No. 09/603,867, filed on Jun. 26, 2000, now Pat. No. 6,276,808.
(60) Provisional application No. 60/141,043, filed on Jun. 24, 1999.

(51) Int. Cl.[7] .............................................. G02B 7/182
(52) U.S. Cl. ...................... 359/877; 359/878; 359/871; 359/872
(58) Field of Search ................................ 359/877, 878, 359/871, 872, 841, 843, 854, 844; 248/477, 478, 479, 549

(56) References Cited

U.S. PATENT DOCUMENTS

| | | | | |
|---|---|---|---|---|
| 5,028,029 A | * | 7/1991 | Beck et al. ................ | 248/479 |
| 5,639,054 A | * | 6/1997 | Gerndt et al. .............. | 248/478 |
| 5,640,281 A | * | 6/1997 | Cho ........................... | 359/841 |
| 5,841,594 A | * | 11/1998 | Rothe ........................ | 359/841 |

* cited by examiner

Primary Examiner—Mohammad Sikder
(74) Attorney, Agent, or Firm—Clark Hill PLC

(57) ABSTRACT

A mirror assembly for use on an automotive vehicle comprises a support base for fixedly mounting the mirror assembly to the vehicle. The mirror assembly further includes an upper and lower support arm, each extending longitudinally between a first end and a second end. A collar having an upper chamber and a lower chamber is fixedly secured to the first ends of the support arms and pivotally coupled to the support base for pivoting the support arms about a generally vertical axis between an operative position extending laterally from the vehicle and a folded position pivoted adjacent and generally parallel to the vehicle. A housing is slidably coupled to the second ends of the support arms and slidable therealong between a retracted position adjacent the first ends and an extended position adjacent the second ends. A mirror pane is operatively coupled to the housing for providing an adjustable reflective view from the mirror assembly. The mirror assembly further includes a drive mechanism housed within the lower support arm and lower chamber of the collar and operatively coupled to the housing by a clutch mechanism for moving the housing between the retracted position and the extended position. The mirror assembly also includes a pivot mechanism housed within the upper chamber of the collar and operatively coupled to the support base for pivoting the support arm between the operative position and the folded position.

15 Claims, 9 Drawing Sheets

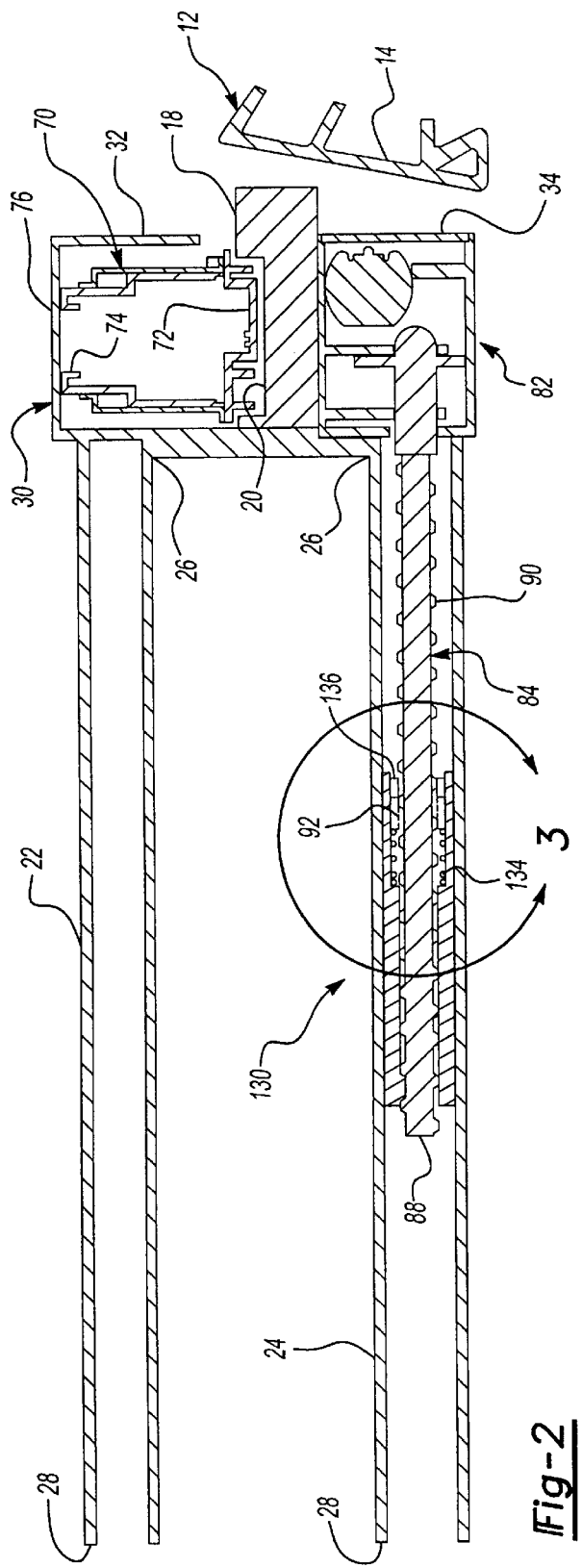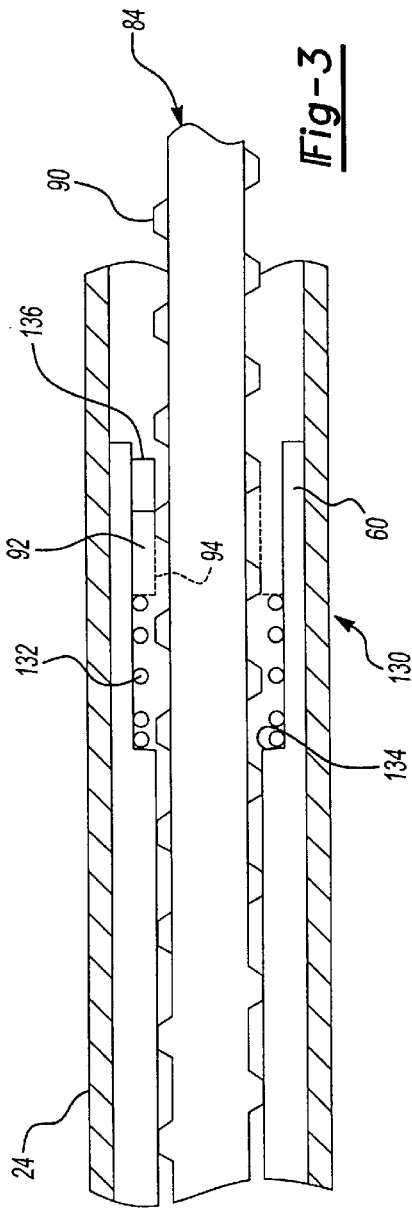

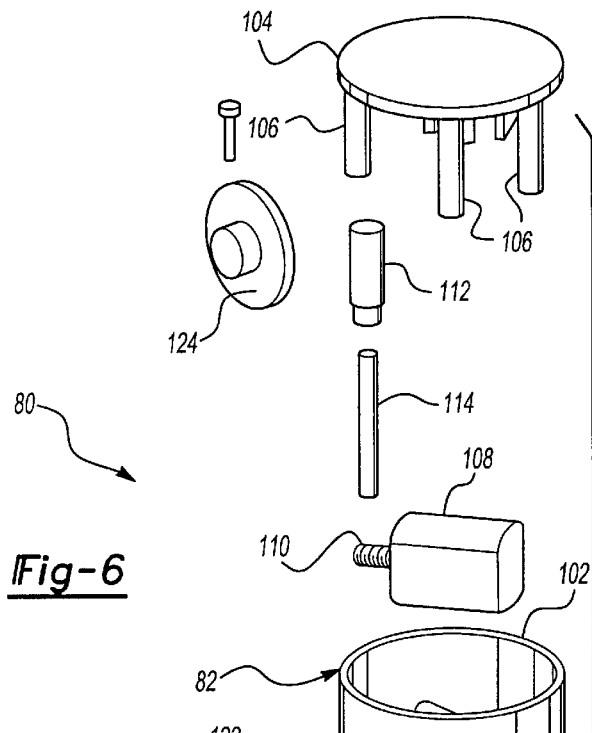
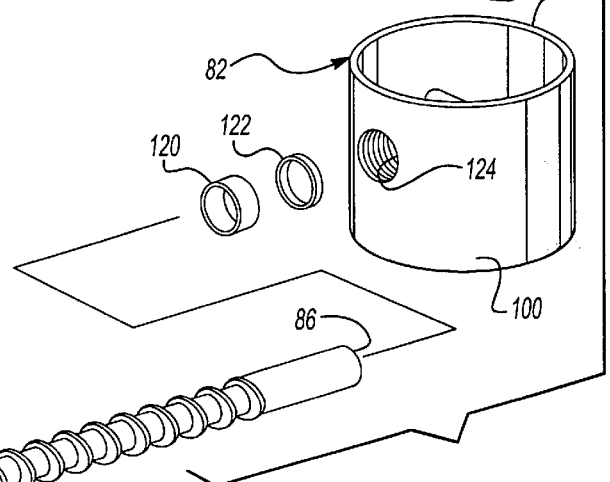
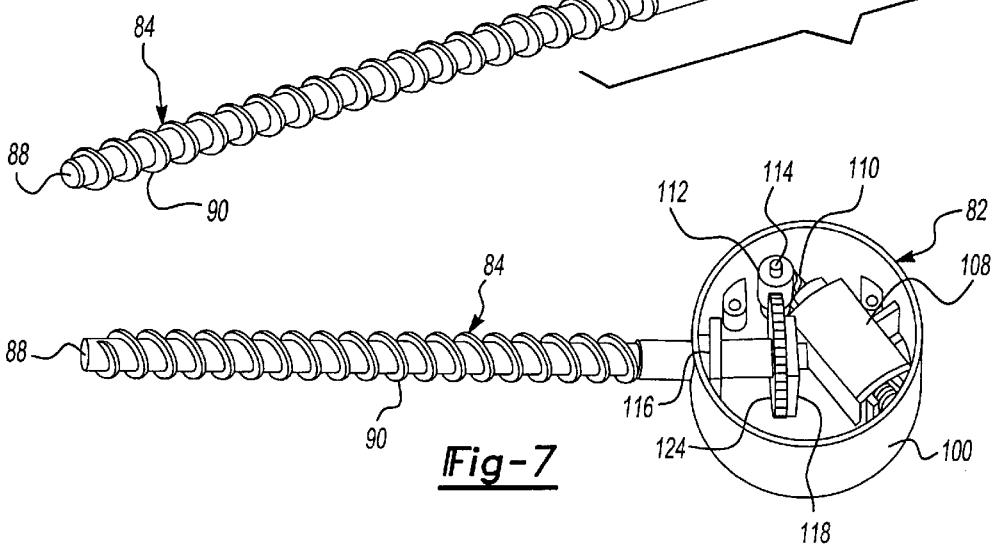
Fig-6
Fig-7

EXTENDABLE MIRROR WITH IMPROVED DETENT

This application is a CIP of Ser. No. 09/603,867 Jun. 26, 2000 U.S. Pat. No. 6,276,808 which claims benefit of No. 60/141,043 Jun. 24, 1999.

BACKGROUND OF THE INVENTION

1. Field of Invention

The present invention relates generally to a mirror assembly for use on an automotive vehicle.

2. Background of Invention

Automotive vehicles typically include a pair of exterior rearview mirror assemblies mounted to opposite sides of the vehicle for providing the occupant of the vehicle a rearward reflective view from the vehicle. These mirror assemblies commonly include a base for mounting the mirror assembly to the vehicle and an elongated support arm coupled to the base for supporting a mirror housing or shell. A glass mirror pane is mounted within the housing for providing the reflective view from the vehicle. It is also known to pivotally mount the support arm to the base to provide pivotal movement of the housing from an extended, unfolded position, projecting laterally from the side of the vehicle, to a folded position collapsed against the side of the vehicle. This pivotal movement of the mirror assembly effectively reduces the overall width of the vehicle and assists in preventing damage to the mirror assembly caused by impact with external stationary objects. It is also known to provide manual or power operated pivoting movement of the mirror assembly by mounting a pivot mechanism in the base of the assembly.

It is further known to provide a mirror assembly that is extendable from a retracted position adjacent the side of the vehicle to an extended position spaced outwardly, or laterally, from the side of the vehicle to increase or expand the field of rearward view from the vehicle. Such mirror assemblies are often employed on sport utility vehicles, trucks, and/or vans to expand the field of view from the vehicle when used for towing a secondary vehicle or trailer. These mirror assemblies typically include some form of track mechanism coupled between the housing and the support arm for sliding the housing along the support arm. The mirror assembly may be extended or retracted by manually sliding the housing along the support arm. Alternatively, a motor and gear drive mechanism may be provided for automatically moving the housing along the support arm between the retracted and extended position. The prior art includes a motor and gear drive mechanism mounted to the housing. The additional size and weight of the motor and gear drive mechanism in the housing adds stress the support arm and its attachment to the base and vehicle.

Therefore, it is desirable to reduce the size, mass, and weight in the housing of the mirror assembly and to reduce the load and stress on the support arm and base supporting the support arm and housing.

SUMMARY OF THE INVENTION

The present invention includes a mirror assembly for use on an automotive vehicle comprising a support base adapted to be fixedly mounted to the vehicle. At least one support arm extends longitudinally between a first end and a second end. The first end is pivotally supported by the support base and the second end extends laterally from the support base. A collar is pivotally coupled between the support arm and the support base for pivoting the support arm about a generally vertical axis between an operative position extending laterally from the vehicle and a folded position pivoted adjacent and generally parallel to the vehicle. A housing is coupled to the support arm and a mirror pane is operatively coupled to the housing for providing a reflective view from the mirror assembly. A detent mechanism is operatively coupled between the support base and the collar for locating and biasing the support arm in each of the operative and folded positions in response to pivotal movement of the support arm and the mirror assembly therebetween.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side sectional view of a pair of support arms and collar mounted to a support base showing a pivot mechanism and drive mechanism housed within the collar of the mirror assembly;

FIG. 3 is an enlarged sectional view of section 3 of FIG. 2 showing a portion of the drive mechanism and clutch mechanism;

FIG. 6 is an exploded perspective view of the drive mechanism;

FIG. 7 is a top perspective view of the drive mechanism;

DETAILED DESCRIPTION OF THE PREFERRED EMBODIMENT

Figure 1:
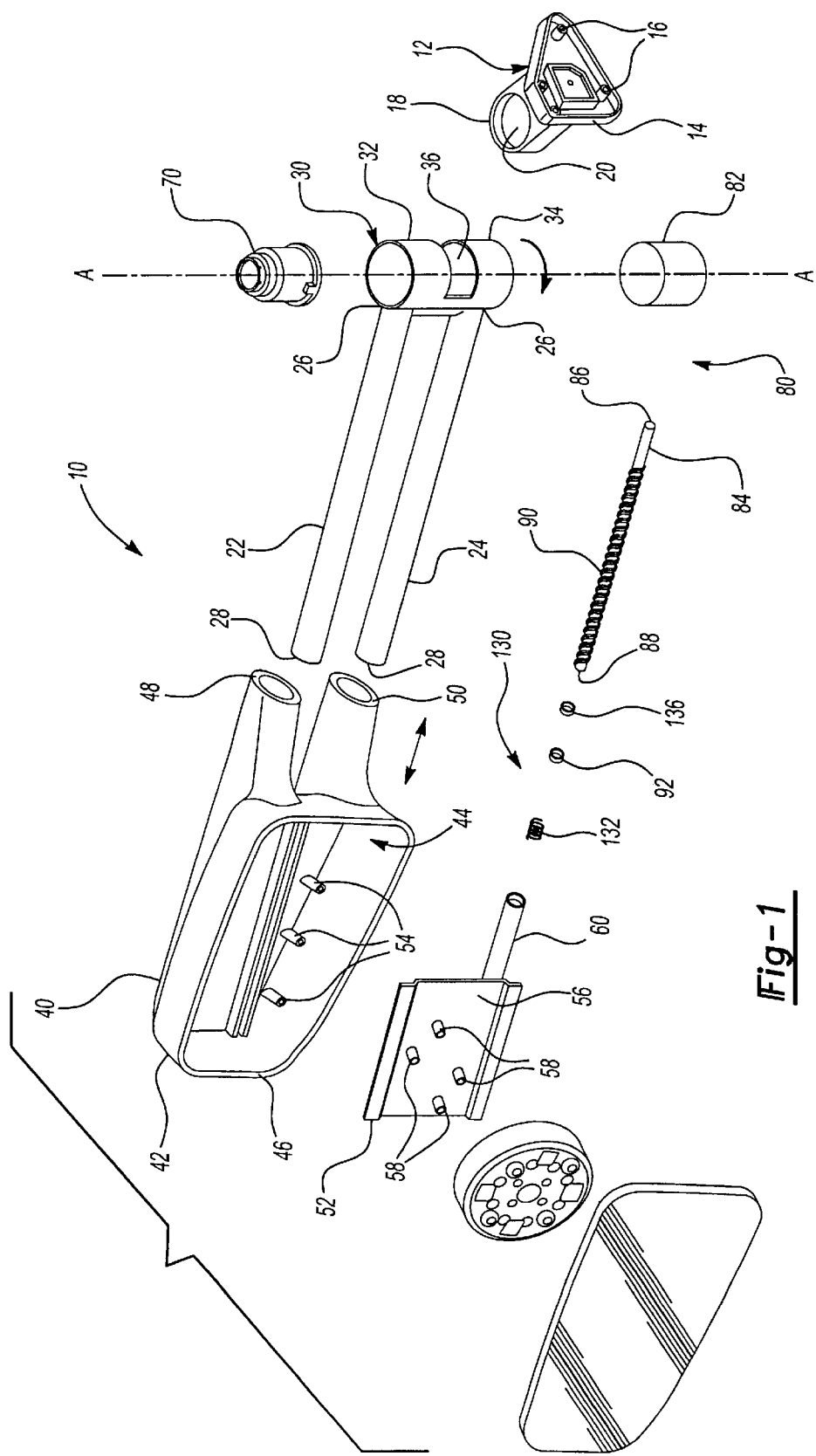
FIG. 1 is an exploded perspective view of a mirror assembly according to the subject invention.
Figure 4:
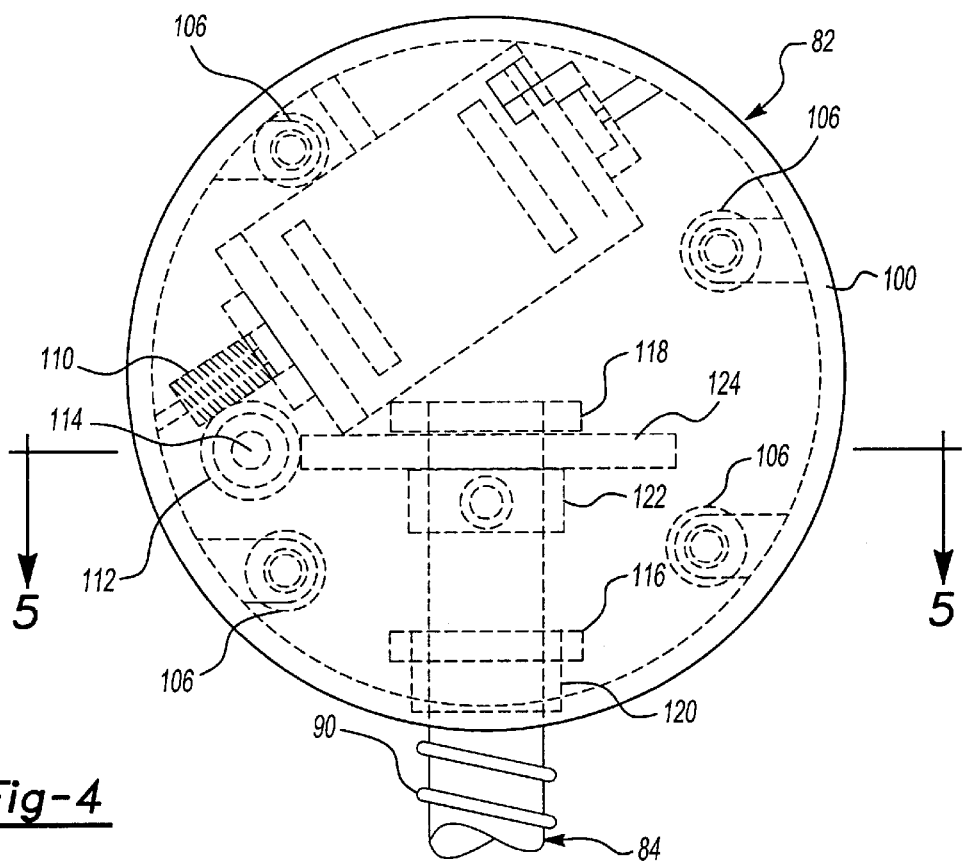
FIG. 4 is a top view of a motor assembly of the drive mechanism.
Figure 5:
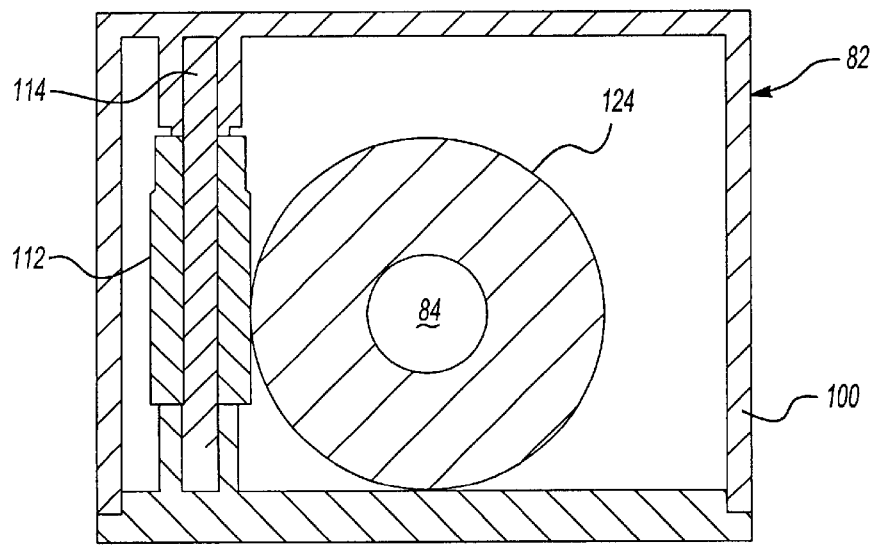
FIG. 5 is a cross-sectional view taken along line 5—5 of FIG. 4.

Referring to the Figures, wherein like numerals represent like or corresponding parts throughout the several views, an exterior rearview mirror assembly for an automotive vehicle is generally shown at 10 in FIG. 1. The mirror assembly 10 includes a support base 12 adapted to be fixedly mounted to the vehicle (not shown). The support base 12 includes a planar mounting plate 14 having a plurality of bosses 16 for receiving fasteners, such as screws, to fixedly secure and mount the mirror assembly 10 to the vehicle. The mirror assembly 10 is typically mounted to an A-pillar or side door panel of the vehicle as conventionally known in the art. The support base 12 further includes a base plate 18 extending outwardly and generally perpendicular from the mounting plate 14. The base plate 18 includes a circular and planar mounting shelf 20 in the center thereof. The mirror assembly 10 further includes an upper support arm 22 and a spaced apart and parallel lower support arm 24. Each of the support arms 22, 24 are elongated, hollow tubular cylinders extending between a first end 26 and a second end 28. The mirror assembly 10 also includes a collar 30 pivotally coupled between the support arms 22, 24 and the support base 12 for pivoting the support arms 22, 24 about a generally vertical axis, shown at A, between an operative position extending laterally from the vehicle and a folded position pivoted adjacent and generally parallel to the vehicle. The collar 30 is defined by a generally cylindrical, hollow tubular body forming an upper chamber 32 and a lower chamber 34. The upper chamber 32 and lower chamber 34 are partially separated and spaced apart by a generally horizontal slot 36. The first ends 26 of the upper and lower support arms 22, 24 are fixedly secured, by welds or the like, to the upper chamber 32 and lower chamber 34, respectively, of the collar 30. The collar 30 is further pivotally mounted to the support base 12 by the base plate 18 being received within the slot 36 as will be further described hereinbelow.

The mirror assembly 10 further includes a mirror housing 40 coupled to the upper and lower support arms 22, 24 and slidable therealong between a retracted position adjacent the first ends 26 and an extended position adjacent the second ends 28, spaced from the first ends 26. The housing 40 includes an outer shell 42 defining a concave cavity 44 and having a peripheral rim 46 defining an opening into the cavity 44. The housing 40 further includes a hollow upper tubular sleeve 48 and a spaced apart hollow lower tubular sleeve 50 extending outwardly from the outer shell 42. The second ends 28 of the upper and lower support arms 22, 24 are slidably received in the upper tubular sleeve 48 and lower tubular sleeve, respectively, for supporting the housing 40 on the arms 22, 24 between the retracted and extended positions.

The mirror assembly 10 also includes a mirror support bracket 52 received with the cavity 44 of the housing 40 and fixedly secured to the outer shell 42 by fasteners or the like mounted to bosses 54 extending from the back wall of the shell 42. The bracket 52 includes a flat, planar bracket plate 56 having mounting bosses 58 projecting therefrom and a hollow, elongated tube 60 defining a cylindrical bore 61 therethrough. The tube 60 is fixedly secured, by fasteners, welds, or the like, to the plate 56 and extends from the plate 56 to be received in the lower tubular sleeve 50 such that the open end of the tube 60 is aligned flush with the open end of the sleeve 50. A manual or power mirror adjustor 62 is mounted to the bosses 58 on the bracket plate 56 for supporting a glass mirror pane 64. The glass mirror pane 64 provides a reflective view from the mirror assembly 10 to the occupant of the vehicle. The adjustor 62 provides for manual or power angular adjustment of the glass mirror pane 64 relative to the housing 40 to adjust the angle of the reflective view to the occupant. The description and operation of the adjustor 62 is fully set forth in applicant's U.S. Pat. No. 5,467,230, which is incorporated herein by reference in its entirety.

Still referring to FIG. 1, the mirror assembly 10 includes a pivot mechanism 70 housed within the collar 30 and operatively coupled between the support base 12 and the collar 30, or upper support arm 22, for pivoting the support arms 22, 24 and housing 40 between the operative position and the folded position. More specifically, referring to FIGS. 1 and 2, the pivot mechanism 70 includes a bottom portion 72 supported and mounted to the mounting shelf 20 of the base plate 18 and a top portion 74 mounted to a top cap 76 of the upper chamber 32 in the collar 30. The top portion 74 rotates in the clockwise and counterclockwise direction relative to the bottom portion 72. The pivot mechanism 70 is capable of providing both manual and power actuated pivoting movement of the collar 30, support arms 22, 24 and thus housing 40, between the operative, or unfolded position, and the folded position. The operation and detailed description of the pivot mechanism 70 is fully set forth in applicant's U.S. Pat. Nos. 5,703,731; 5,703,732; and 5,684,646, which are incorporated herein by reference in their entirety.

Referring back to FIG. 1, the mirror assembly 10 further includes a drive mechanism, generally shown at 80, having at least a portion housed within the collar 30 and operatively coupled to the housing 40 for moving the housing 40 along the support arms 22, 24 between the retracted and extended position. The drive mechanism 80 includes a motor assembly 82 mounted within the lower chamber 34 of the collar 30. The drive mechanism 80 further includes a drive shaft 84 extending from the motor assembly 82 through the lower support arm 24 and tube 60. The drive shaft 84 includes a first end 86 rotatably coupled to the motor assembly 82 and a second end 88 rotatably coupled to the tube 60 of the mirror support bracket 52 for driving the bracket 52 and housing 40 between the retracted and extended positions. Referring to FIGS. 1, 2 and 3, the drive shaft 84 is an elongated, cylindrical drive screw having external helical threads 90. The drive mechanism 80 includes a drive nut 92 having internal helical threads 94, shown in FIG. 3, for mating threaded engagement with the threads 90 on the drive screw 84 for movement therealong between the first and second ends 86, 88.

Referring to FIGS. 4–7, and particularly FIG. 6, the motor assembly 82 includes a cylindrical motor housing 100 having an opened top 102 and a cap 104 for closing the opened top 102. The cap 104 has a plurality of downwardly extending bosses 106 for receiving fasteners, such as screws, to secure the cap 104 to the housing 100. The motor assembly 82 further includes an electric motor 108 for rotating an integrally attached driving worm gear 110. The motor 108 is stored and secured with the housing 100 as shown in FIG. 7. The motor assembly 82 further includes a driven worm gear 112 rotatably secured to the housing 100 by a gear shaft 114 and seated perpendicular to and in mating engagement with the driving worm gear 110. The housing 100 includes a pair of spaced apart shaft support collets 116, 118 for supporting the first end 86 of the drive screw 84 within the housing 100. A pair of bearings 120, 122 are rotatably coupled about the first end 86 of the drive screw 84 with the end 86 inserted through an opening 123 in the housing 100 and seated on the collets 116, 118, respectively, for allowing the drive screw 84 to rotate on the collets 116, 118. Finally, the motor assembly 82 includes a drive gear 124 secured to the first end 86 of the drive screw 84 and meshed with the driven worm gear 112. The operation of the motor assembly 82 will be described in detail below.

Referring to FIGS. 1, 2 and 3, the drive mechanism 80 further includes a clutch mechanism 130 coupled between the drive shaft 84 and the support bracket 52 for selectively actuating the drive mechanism 80 to manually slide the housing 40 along the support arms 22, 24 between the retracted and extended positions. More specifically, the clutch mechanism 130 includes a spring bias member 132, such as a coil spring, seated within the bore of the tube 60 and around the drive shaft 84, as shown in FIG. 3. The spring 132 is compressed between a shoulder 134 inside the tube 60 and the drive nut 92. The clutch mechanism 130 further includes a retaining ring 136 forming a through-hole fixedly secured to the inside of the tube 60 on the opposite side of the drive nut 92 from the spring 132. The fixed retaining ring 136 maintains the spring 132 in compression between the shoulder 134 and the drive nut 92.

The motor assembly 82 of the drive mechanism 80 is therefore completely housed and contained within the collar 30. The remaining portions of the drive mechanism 80 are housed and contained in the lower support arm 24. Additionally, the pivot mechanism 70 is also completely housed and contained within the collar 30. Therefore, the size, mass and weight of the pivot mechanism 70 and drive mechanism 80 is removed from the mirror housing 40 to reduce the torque and stress on the mirror housing 40 supported by the arms 22, 24 and base 12.

In operation, the mirror assembly 10 may be manually actuated or power actuated between the operative, unfolded, position and the folded position, as well as between the retracted position and extended position. In order to power actuate the mirror assembly 10 between the operative position and folded position, electrical power is sent to the pivot mechanism 70 to rotate the top portion 74 relative to the bottom portion 72 in either the clockwise or counterclockwise direction. The pivot mechanism 70, in turn, forces the collar 30, support arms 22, 24 and mirror housing 40 to rotate about the support base 12. To manually actuate the mirror assembly 10, the housing 40 or support arms 22, 24 are simply pivoted about the support base 12. The pivot mechanism 70, therefore, allows both power nd manual actuation as disclosed in applicant's U.S. patents referenced above.

In order to power actuate the mirror assembly 10 between the retracted position and the extended position, electrical power is sent to the motor 108. The motor 108 rotates the driving worm gear 110 in either the clockwise or counterclockwise direction, as desired. The driving worm gear 110 rotates the driven worm gear 112 and drive gear 124 on the drive screw 84. During power actuation, the spring 132 compresses the drive nut 92 against the retaining ring 136 with sufficient force to frictionally interlock the drive nut 92, ring 136, and tube 60 of the support bracket 52. Therefore, the drive screw 84 will rotate within the drive nut 92, transferring the drive nut 92 along the longitudinal length of the drive screw 84. The housing 40 is, therefore, extended or retracted along the support arms 22, 24 between the retracted and extended positions, or any position therebetween. In order to manually actuate the mirror assembly 10 between the retracted and extended positions, a manual force is simply applied to the housing 40 to slide the housing 40 along the support arms 22, 24, toward or away from the support base 12. The drive mechanism 80, and particularly the clutch mechanism 130, must therefore also allow the drive nut 76 to freely rotate about a stationary drive screw 84. Specifically, when there is no power supplied to the motor 108, the gears 110, 112 and 114 are locked and prevent the drive screw 84 from rotating in either the clockwise or counterclockwise direction. When a sufficient force is applied to the housing 40 along the longitudinal direction of the support arms 22, 24, the support bracket 52 pushes or pulls on the tube 60. The drive nut 92 is operatively coupled to the tube 60 between the spring 132 and ring 136. The drive nut 92 is also coarsely threaded onto the drive screw 84. With the drive screw 84 locked against rotation, the drive nut 92 is able to overcome the compression force of the spring 132 and rotate about the drive screw 84. The rotation of the drive nut 92 about the drive screw 84 transfers the drive nut 92 longitudinally along the length of the drive screw 84 and allows the housing 40 to slide along the support arms 22, 24 between the retracted and extended positions. The spring 132 also provides enough compression and friction force between the drive nut 92, ring 136, and tube 60 to maintain the housing 40 in any position along the support arms 22, 24 between the retracted and extended positions.

It should be appreciated that the pivot mechanism 70 and drive mechanism 80 may be interchanged between the upper and lower chambers 32, 34 of the collar 30 without varying from the scope of the invention. It should also be appreciated that the mirror assembly 10 may only include a single support arm 22 or 24 supported by the collar 30.

Figure 8:
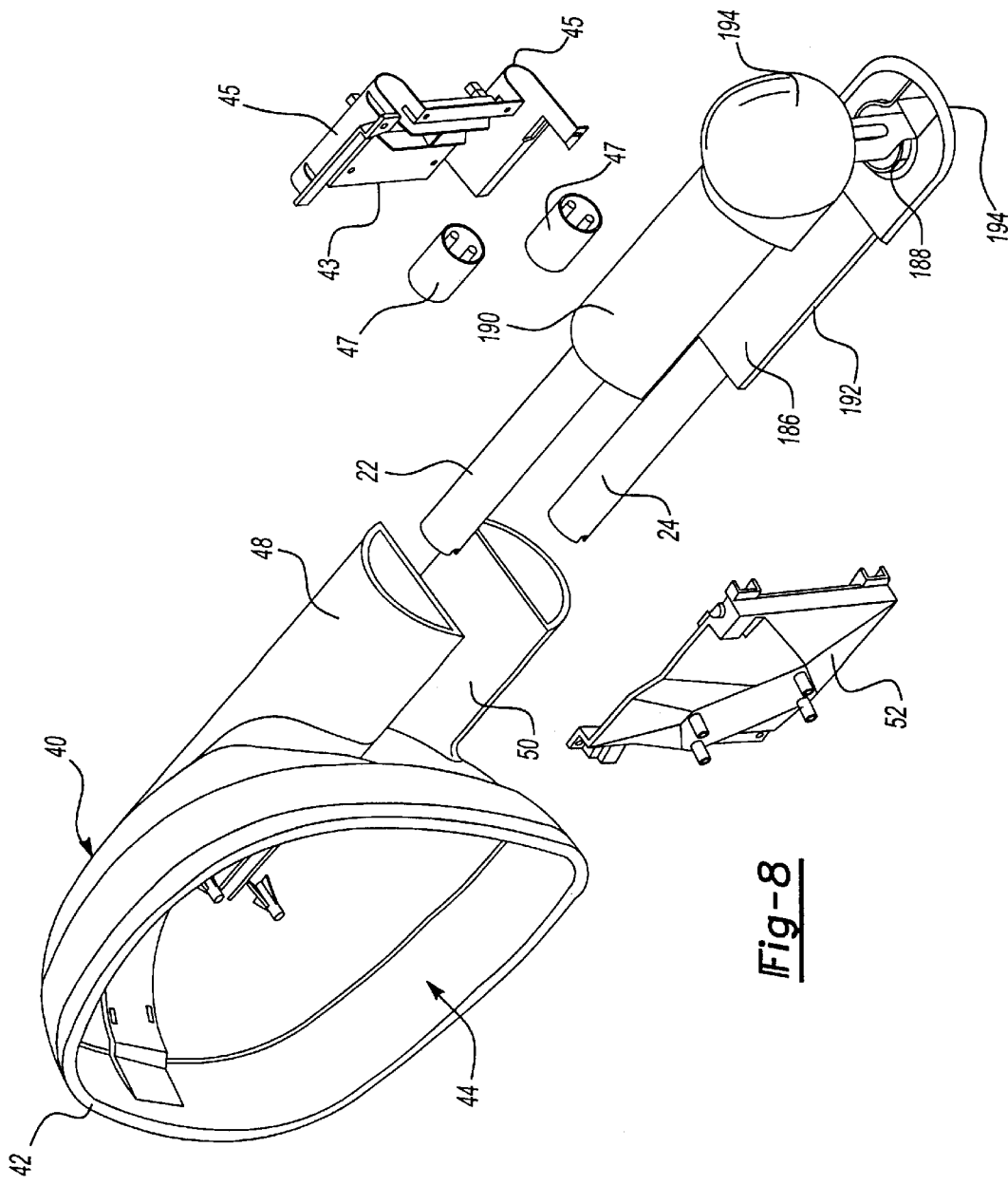
FIG. 8 is an exploded perspective view of an alternative embodiment of the mirror assembly.
Figure 9:
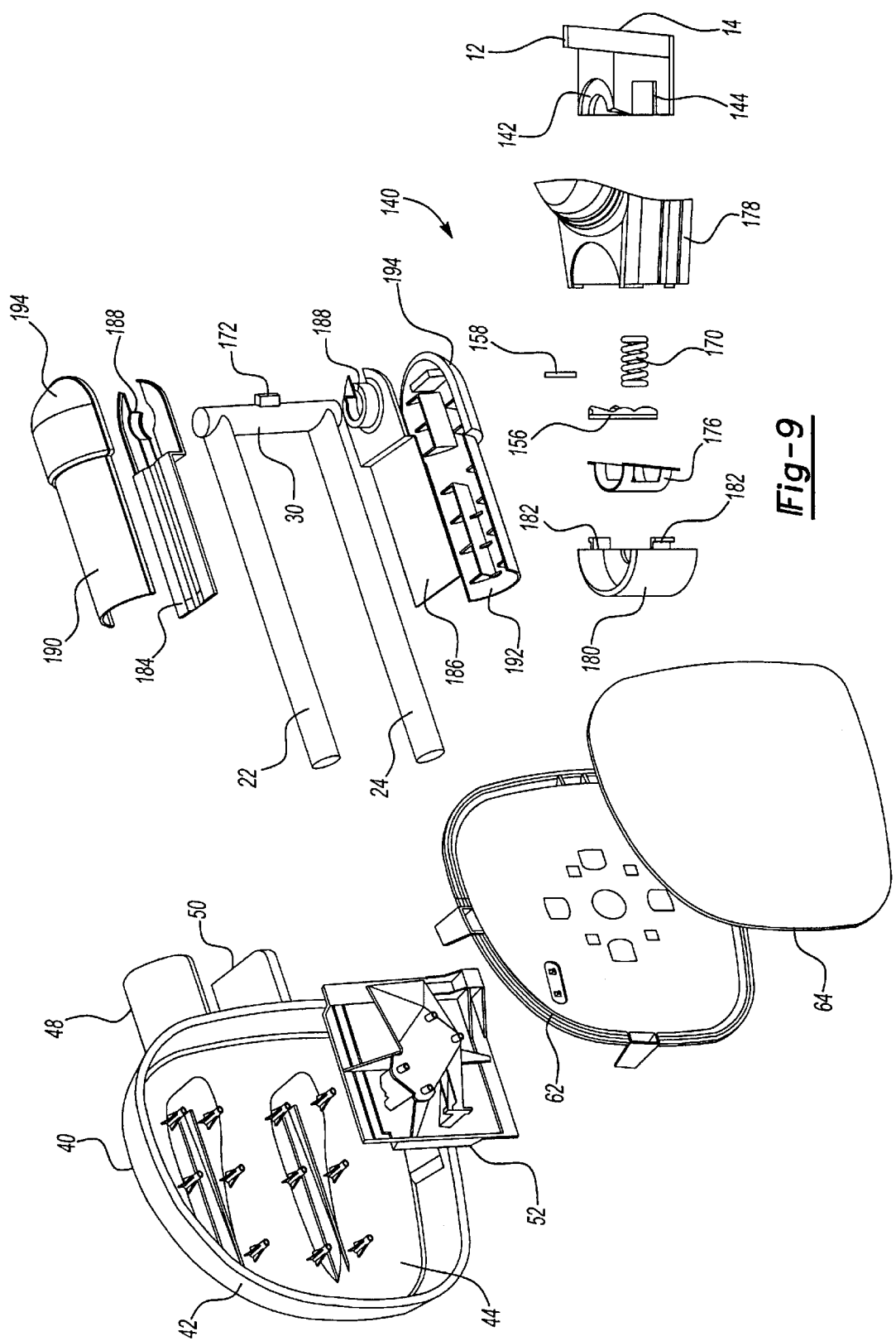
FIG. 9 is a partially exploded perspective view of the alternative embodiment of FIG. 8.

Referring to FIGS. 8 and 9, an alternative embodiment of the mirror assembly is shown in an exploded view at 10. The alternative mirror assembly 10 similarly includes a support base 12 adapted to mount the mirror assembly 10 to the vehicle. The alternative mirror assembly 10 also includes upper and lower support arms 22, 24 interconnected at one end by a collar 30.

The mirror assembly 10 further includes a mirror housing 40 slidably coupled to the upper and lower support arms 22, 24 between the retracted position and the extended position. The housing 40 includes upper and lower tubular sleeves 48, 50 for slidably receiving the upper and lower support arms 22, 24, respectively. The housing 40 includes an outer shell 42 defining a concave cavity 44. A mirror support bracket 52 is received within the cavity 44 and is fixedly secured to the outer shell 42 by a clamp 43 having U-shaped recessed collets 45 for receiving the arms 22, 24. A pair of bearings 47 are seated in the collets 45 to receive the arms 22, 24 therethrough for providing sliding movement between the arms 22, 24 and the clamp 43 and bracket 52. A manual or power mirror adjustor 62 is mounted to the bracket 52 for supporting a glass mirror pane 64.

Figure 10:
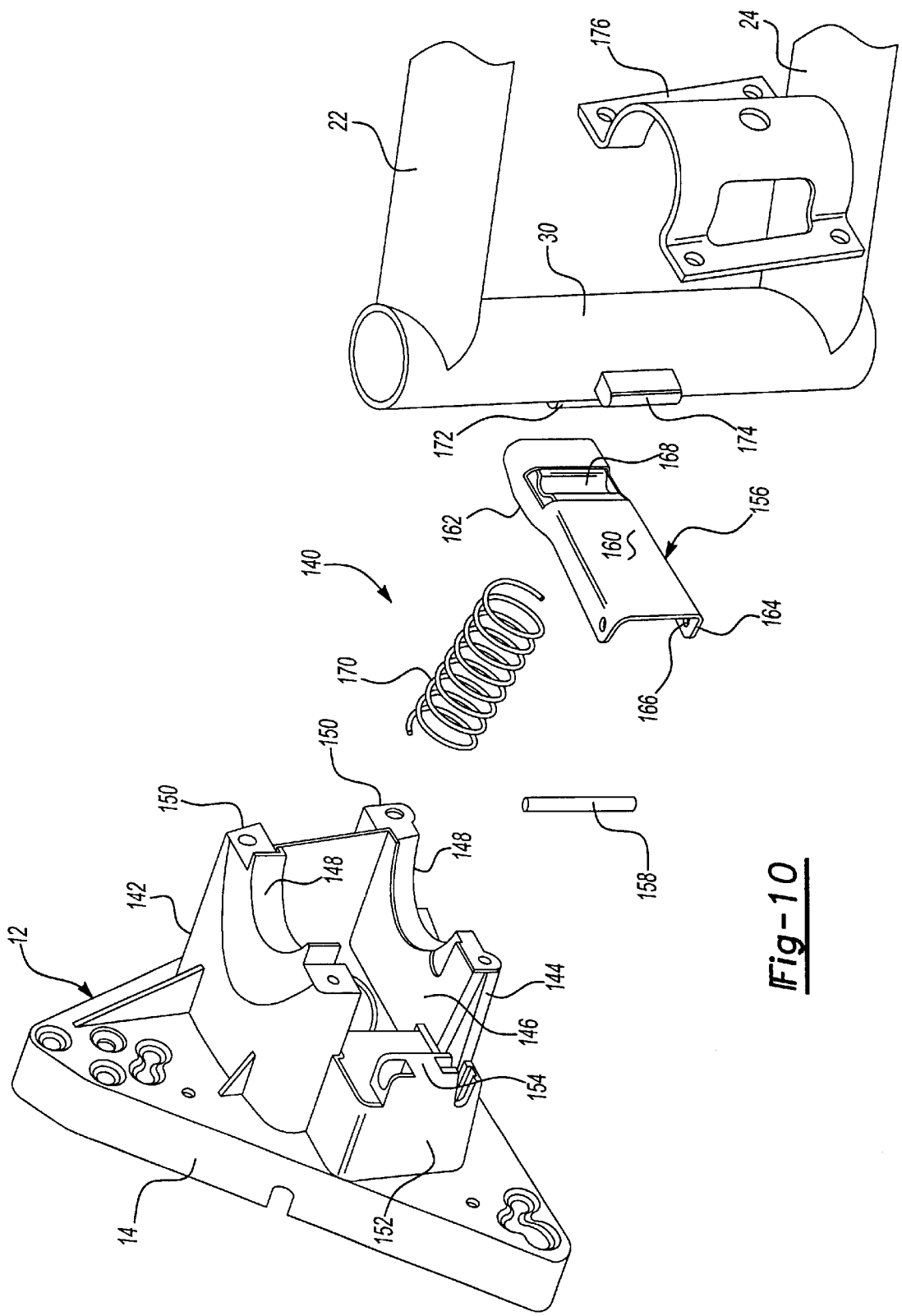
FIG. 10 is an exploded perspective view of an improved detent mechanism between the support arms and the support base of the alternative mirror assembly.
Figure 11:
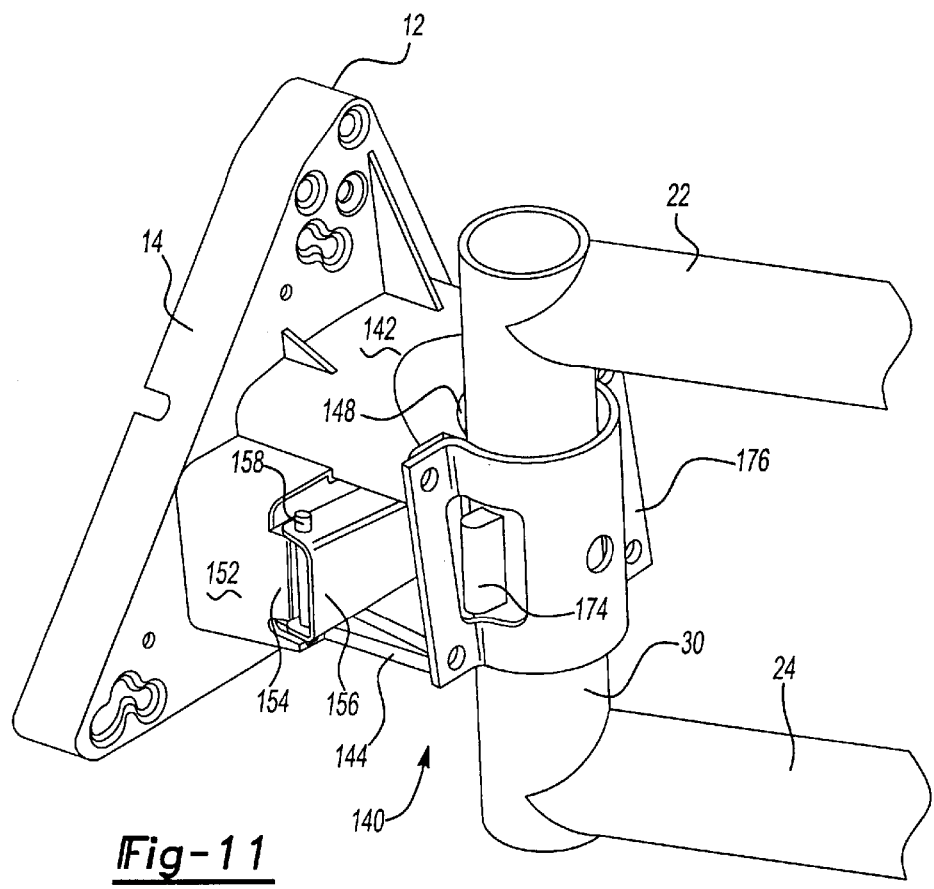
FIG. 11 is a assembled perspective view of the detent mechanism of FIG. 10.

The collar 30 is pivotally mounted to the support base 12 by a detent mechanism 140 for controlling the pivotal movement of the support arms 22, 24 and housing 40 between the operative and folded positions. Referring to FIGS. 8, 10 and 11, the support base 12 further includes a mounting plate 14 for fixedly securing and mounting the mirror assembly 10 to the vehicle. A pair of generally parallel, spaced apart base plates 142, 144 extend outwardly and generally perpendicular from the mounting plate 14 and define a well 146 therebetween. Each base plate 142, 144 includes an arcuate distal end 148 and mounting holes 150. A support wall 152 also extends outwardly and generally perpendicular from the mounting plate 14 between the base plates 142, 144 having a hollow cylindrical mounting collar 154 on the distal end thereof.

The detent mechanism 140 includes a generally U-shaped elongated detent plate 156 having a first end pivotally mounted to the support wall 152 by a pivot pin 158 extending through the detent plate 156 and through the mounting collar 154. More specifically, the detent plate 156 includes a generally planar front face plate 160 extending longitudinally between first and second ends and laterally between perpendicular side plates 162, 164. Apertures 166 extend through the side plate 162, 164 adjacent the first end for receiving the pivot pin 158 therethrough to pivotally mount the detent plate 156 to the mounting collar 154. The front face plate 160 includes a recessed arcuate surface 168 adjacent the second end defining a channel in a portion of the face plate 160. The detent plate 156 is pivotally mounted to the mounting collar 154 by the pin 158 such that the plate 156 is seated between the base plates 142, 144. A spring bias member 170, such as a compression coil spring, is seated in the well 146 between the face of the mounting plate 14 and the back of the front face plate 160 of the detent plate 156. The spring bias member 170 biases the detent plate 156 away from the well 146.

As shown in FIGS. 10 and 11, the collar 30 is positioned against, or seated, on the arcuate distal ends 148 of the base plate 142, 144. The detent plate 156 is bias against the collar 30 by the coil spring 170 for biasing the support arms 22, 24 and housing 40 in the operative and folded positions and for providing frictional resistance when pivoted therebetween. The collar 30 includes a pair of spaced apart detents 172, 174, or nubs, projecting outwardly therefrom for mating alignment and engagement with the recessed arcuate surface 168 in the detent plate 156 to retain the mirror assembly 10 in each of the operative and folded positions, as will be further described. A clamp 176, or U-shaped bracket, is encased about the collar 30 and secured to the base plate 142, 144 by fasteners received in the mounting holes 150 to fixedly secure the collar 30 between the clamp 176 and the base plates 142, 144. A hollow plastic cover 178 houses the support base12 to cover and enclose the detent mechanism 156 and inner portion of the collar 30. An arcuate shaped plastic cap 180 connects to the cover 178 by snap-hooks 182 to cover the clamp 176 of outer portion of the collar 30.

Figure 12:
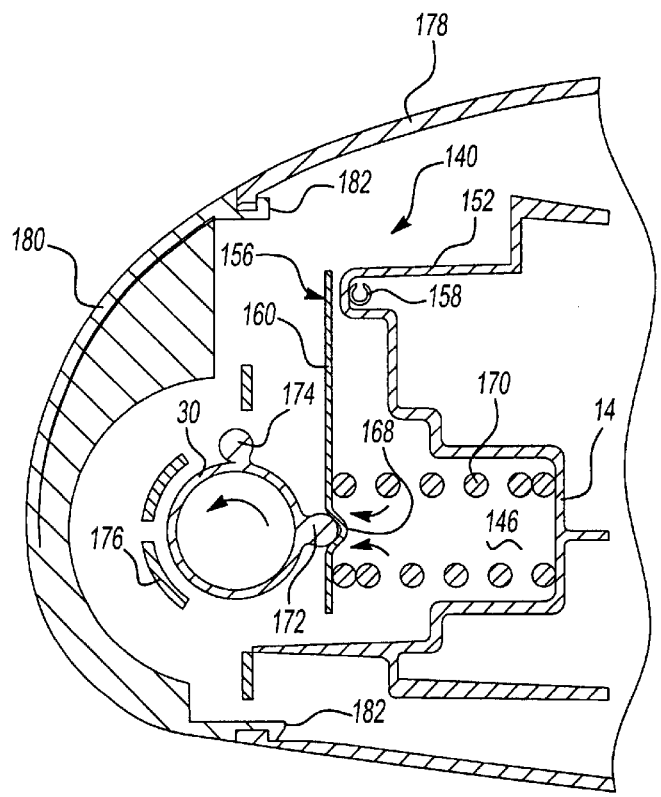
FIG. 12 is a sectional view of the detent mechanism with the mirror assembly in an operative position.
Figure 13:
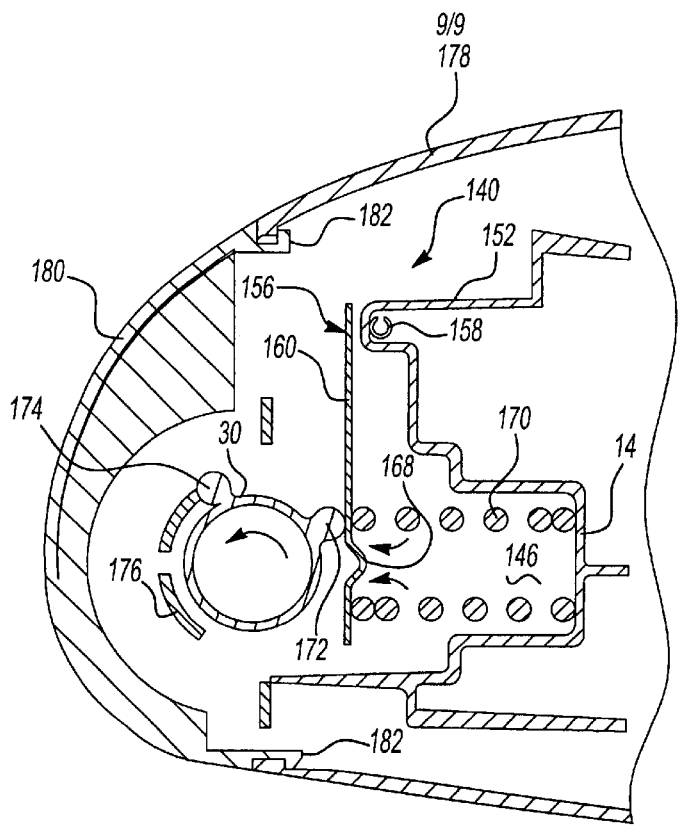
FIG. 13 is a sectional view of the detent mechanism with the mirror assembly pivoted between the operative position and the folded position.
Figure 14:
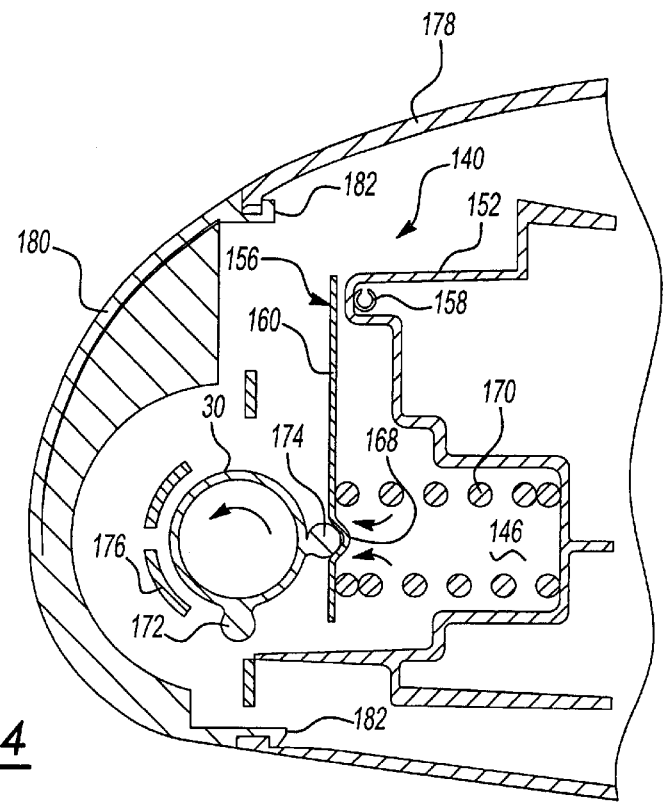
FIG. 14 is a sectional view of the detent mechanism with the mirror assembly in the folded position.

Referring to FIG. 12, the mirror assembly 10 is shown in the operative position extending laterally from the vehicle. The detent 172 is seated against the recessed arcuate surface 168 of the detent plate 156 to locate and retain the collar 30, support arms 22, 24 and mirror assembly 10 in the operative position. The coil spring 170 maintains a frictional biasing force against the collar 30 to retain the mirror assembly 10 in the operative position and to prevent rattle between the detent plate 156 and the collar 30. Referring to FIG. 13, the collar 30 is free to rotate within the arcuate distal ends 148 of the base plates 142, 144 to rotate the arms 22, 24 and mirror assembly 10 from the operative position to the folded position. As the collar 30 rotates between the base plates 142, 144 and the clamp 176, in the counterclockwise direction as shown, the detent 172 presses downwardly on the face plate 160 against the force of the coil spring 170 and exits the recessed arcuate surface 168. As the mirror assembly 10 continues to rotate to the folded position, the detent plate 156 presses and rides against the collar 30, maintaining a friction force there against. In the folded position, as shown in FIG. 14, with the mirror assembly 10 pivoted adjacent and generally parallel to the vehicle, the detent 174 is seated against the recessed arcuate surface 168 of the detent plate 156 to locate and retain the collar 30, support arms 22, 24 and mirror assembly 10 in the folded position.

Finally, the mirror assembly 10 includes a pair of collar sleeves 184, 186 mounted to the collar 30 adjacent the support arms 22, 24, respectively. The collar sleeves 184, 186 include raised bearing rings 188 for guiding the rotation of the collar 30. The sleeves 184, 186 and portion of the arms 22, 24 are covers by plastic shells 190, 192. The shells 190, 192 include bulbous ends 194 which mate with the upper and lower surfaces of the cover 178 and cap 180 to fully enclose the collar 30 and detent mechanism 140.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A mirror assembly for use on an automotive vehicle comprising:

a support base adapted to be fixedly mounted to the vehicle and configured to defined a well therein;

at least one support arm extending longitudinally between a first end and a second end, said first end pivotally supported by said support base and said second end extending laterally from said support base;

a collar pivotally coupled between said support arm and said support base for pivoting said support arm about a generally vertical axis between an operative position extending laterally from the vehicle and a folded position pivoted adjacent and generally parallel to the vehicle;

a housing coupled to said support arm;

a mirror pane operatively coupled to said housing for providing a reflective view from said mirror assembly;

a detent mechanism operatively coupled between said support base and said collar for locating and biasing said support arm in each of said operative and folded positions in response to pivotal movement of said support arm and said mirror assembly therebetween;

said detent mechanism including a detent plate pivotally coupled to said support base and a spring bias member seated in said well and engaging said detent plate for continuously biasing said detent plate against said collar.

2. A mirror assembly as set forth in claim 1 wherein said collar includes a generally cylindrical body and said support base includes a pair of spaced apart and generally parallel base plates extending therefrom to an arcuate distal end in mating cooperation with said cylindrical body of said collar.

3. A mirror assembly as set forth in claim 2 wherein said support base further includes a support wall extending therefrom adjacent to and between said base plates defining said well therebetween, said support wall having a mounting collar on the distal end thereof.

4. A mirror assembly as set forth in claim 3 wherein said detent plate is pivotally coupled to said mounting collar of said support wall and extends generally parallel to and between said arcuate distal ends of said base plates.

5. A mirror assembly as set forth in claim 4 wherein said detent plate includes a front face plate and opposing side plates defining a generally U-shape cross-section, said side plates each having a aperture therethrough for receiving a pivot pin to pivotally couple said detent plate to said mounting collar.

6. A mirror assembly as set forth in claim 5 wherein said spring bias member includes a coil spring compressed between said support base and said face plate.

7. A mirror assembly as set forth in claim 6 wherein said front face plate of said detent plate includes a recessed arcuate surface defining a channel in a portion thereof.

8. A mirror assembly as set forth in claim 7 wherein said collar includes a pair of spaced apart detent tabs projecting outwardly from said cylindrical body for engaging said detent plate and aligning with said recessed arcuate surface to locate and retain said support arm and said mirror assembly in said operative and folded positions, respectively.

9. A mirror assembly as set forth in claim 8 further including a generally U-shaped clamp coupled around said collar and fixedly secured to said base plates for pivotally retaining said collar against said arcuate distal ends of said base plates and said detent plate.

10. A mirror assembly as set forth in claim 9 further including an upper support arm having a first end fixedly secured to said collar and a lower support arm spaced from and generally parallel to said upper support arm and having a first end fixedly secured to said collar.

11. A mirror assembly as set forth in claim 10 wherein each of said upper and lower support arms include an opposite second end slidably receiving and supporting said housing for movement between a retracted position adjacent said collar and an extended position spaced from said collar.

12. A mirror assembly as set forth in claim 11 wherein said housing includes an upper tubular sleeve for slidably receiving said upper support arm therein and a lower tubular sleeve for slidably receiving said lower support arm therein.

13. A mirror assembly as set forth in claim 12 wherein said housing includes an outer shell supporting said upper and lower tubular sleeve, said outer shell defining a concave cavity and having a peripheral rim defining an opening into said cavity for receiving said mirror pane.

14. A mirror assembly as set forth in claim 13 further including a generally hollow cover member for covering said support base, said base plates and a portion of said collar between said upper and lower support arms.

15. A mirror assembly as set forth in claim 14 further including a generally arcuate shaped cap member connected to said cover member for covering said clamp, detent mechanism and remaining portion of said collar between said upper and lower support arms.

\* \* \* \* \*

UNITED STATES PATENT AND TRADEMARK OFFICE
CERTIFICATE OF CORRECTION

PATENT NO. : 6,439,730 B1
DATED : August 27, 2002
INVENTOR(S) : Foote et al.

It is certified that error appears in the above-identified patent and that said Letters Patent is hereby corrected as shown below:

Column 1,
Line 53, insert -- to -- after "stress";

Column 2,
Line 45, delete "a" and insert -- an -- therefor;

Column 4,
Line 54, insert -- first -- before "end 86";

Column 5,
Line 16, delete "is" and insert -- are -- therefor;
Line 33, delete "nd" and insert -- and -- therefor;

Column 7,
Line 13, delete "bias" and insert -- biased -- therefor;
Line 26, delete "base12" and insert -- base 12 -- therefor;
Line 60, delete "covers" and insert -- covered -- therefor;

Column 8,
Line 10, delete "defined" and insert -- define -- therefor; and
Line 52, delete "a aperture" and insert -- an aperture -- therefor.

Signed and Sealed this

Twenty-eighth Day of January, 2003

JAMES E. ROGAN
*Director of the United States Patent and Trademark Office*